May 10, 1960 A. GANAHL 2,935,861
RESILIENT COUPLINGS FOR OSCILLATORY TOOLS
Filed Dec. 11, 1957 2 Sheets-Sheet 1

INVENTOR
ALFRED GANAHL

BY: Toulmin & Toulmin
ATTORNEYS

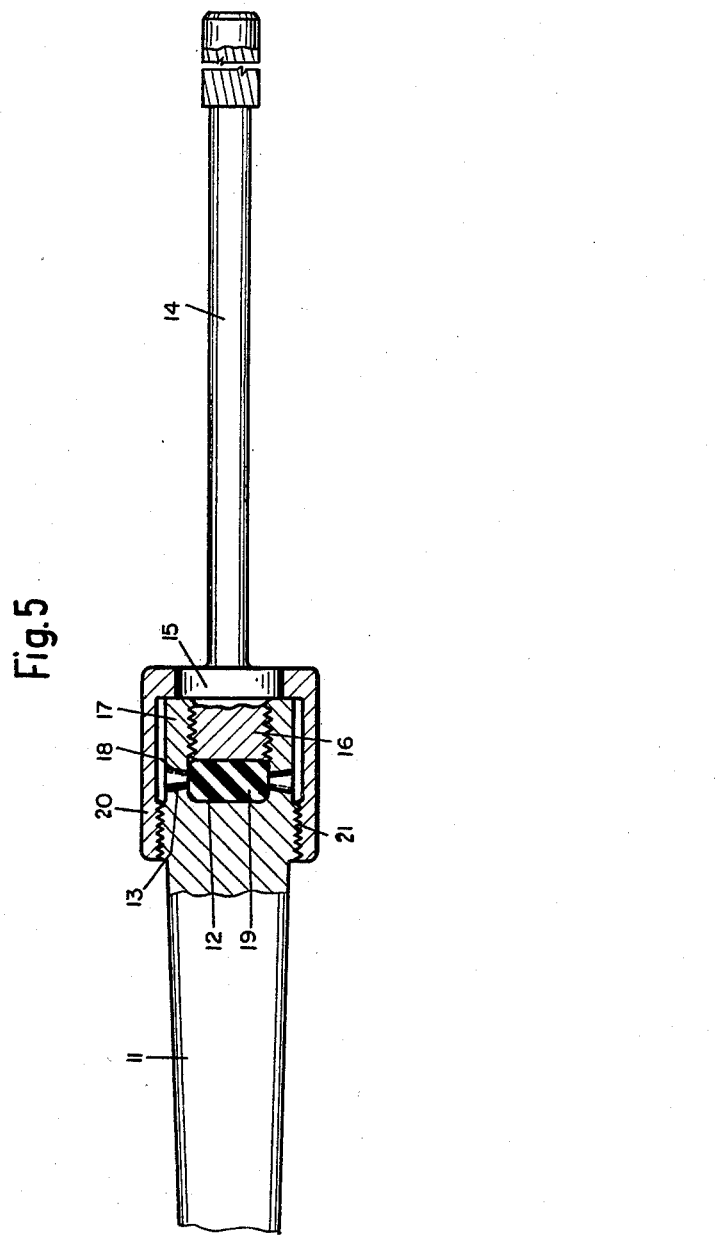

United States Patent Office 2,935,861
Patented May 10, 1960

2,935,861
RESILIENT COUPLINGS FOR OSCILLATORY TOOLS

Alfred Ganahl, Kloten, Zurich, Switzerland, assignor to Heinrich Schmid, vormals A. Schmid & Sohn, Rapperswil, St. Gallen, Switzerland Application December 11, 1957, Serial No. 702,171
Claims priority, application Switzerland December 18, 1956

2 Claims. (Cl. 64—14)

The present invention relates to resilient couplings for oscillatory tools, and has the principal object of providing a coupling which allows the tool proper to be self-centering in a pre-machined bore and to adapt itself in all directions to this guide bore by the possibility of slight oscillatory movements. It is another object to provide a screw tap similarly adapting itself to pre-bored bores when tapping screw threads. It is yet another object of the invention to provide a coupling which allows a tool to oscillatorily be guided in a pre-machined bore and to have all its cutting teeth uniformly stressed and thereby to have its life time prolonged and the quality of the finish of its work improved. It is yet a further object of the present invention to attain these results both with an oscillatory chuck in combination with ordinary tools proper, or with special oscillatory tools.

With these and other objects, which will be apparent later in this specification, in view, I provide a resilient coupling for oscillatory tools, comprising in combination: a shank adapted to be fitted into and to be driven by a machine tool, serrations provided at its free end face, a tool carrier chuck or tool proper having complementary end face serrations, a resilient intermediary member having end serrations on both faces interposed between and coupling the said shank with the said tool carrier chuck or tool proper, and a screw having a resilient washer clamping the said components together.

In another embodiment of my said invention I provide in combination: a shank adapted to be fitted into and to be driven by a machine tool, serrations provided at its free end face, a coupling member having complementary serrations on its end face and adapted to be detachably connected to the tool proper, a resilient intermediary piece having serrations at both end faces interposed between the said shank and the said coupling member, and a cap nut overlapping the said coupling member and screwed on the adjacent end of the said shank, axially pressing the said components together.

Preferably the said coupling member is designed as a cylindrical sleeve and is screwed to the said tool proper.

The accompanying drawing shows several embodiments by way of example of such resilient couplings, namely:

Fig. 5 shows as a further embodiment the coupling of a reamer tool with a Morse cone.

Figure 1:
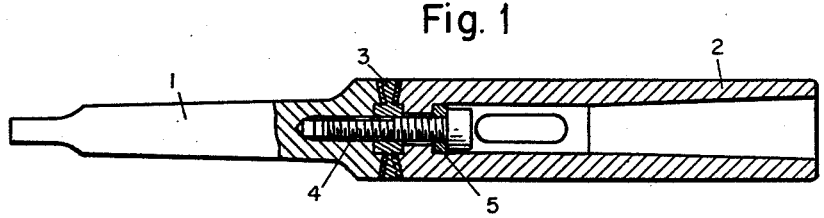
Fig. 1 is a longitudinal section of a first embodiment of an oscillating chuck with a resilient coupling.
Figure 2:
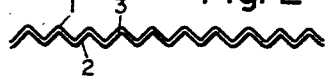
Fig. 2 is a development of the radial serrations of the chuck according to Fig. 1.
Figure 3:
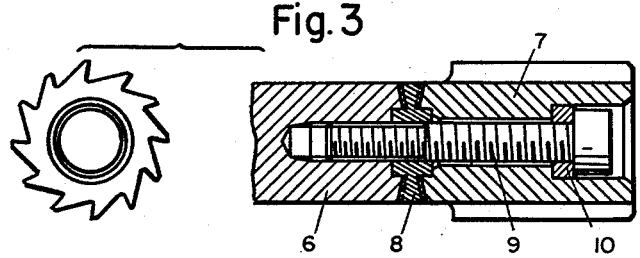
Fig. 3 is a longitudinal section of an oscillating reamer with a resilient clutch.
Figure 4:
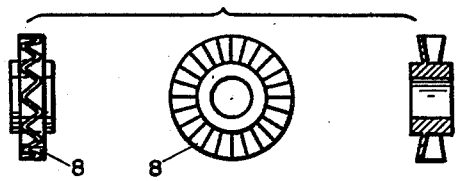
Fig. 4 shows the resilient intermediary piece of the serration clutch in three separate views.

The shank 1 of the tool shown in Fig. 1 for the centering thereof in and being driven by a machine tool carries at its end face teeth or radial serrations which couple the same with the matching radial serrations of the tool carrier chuck 2 for taking-in the cutting tool through a resilient intermediary member 3 by means of a screw 4 with a resilient washer 5. The development of the serrations of the shank 1, of the tool carrier chuck 2 and intermediary member 3 is illustrated in Fig. 2. A reamer tool for direct oscillation is shown in Fig. 3. Here the shank 6 with serrations is directly coupled with the complementary serrations of the cutting tool 7 through the intermediary member 8 by means of a screw 9 with a resilient washer 10. Fig. 4 shows the resilient intermediary member to be inserted, which has end serrations of complementary shape on both sides. By the connecting screws 4 and 9 the degree of resiliency may be varied within certain limits as required.

It has been found convenient to develop the coupling described hereinabove somewhat differently for use in connection with small calibre tools, e.g. with oscillating reamers of 5 to 15 millimetres diameter. This is done according to the invention in such a manner that the connection between the shank adapted to be fitted into a machine tool, and the tool proper is effected through a coupling member, which is detachably connected to the latter and acts as a tool carrier, this coupling member being provided with serration at one end and being forced against the said shank by a cap nut.

In Fig. 5 of the drawing, 11 denotes a Morse-cone, the right hand side end of which has a central recess 12. The rim running around the latter is provided with end serrations 13. The oscillating reamer 14 has at its rear end a collar 15 and a trunnion 16, which latter is provided with a screw thread which is screwed into the screw tapping of the cylindrical sleeve 17. The sleeve 17 has end serrations 18 co-operating with the said end serrations 13, a resilient intermediary member 19 made e.g. of rubber or a suitable synthetic material being arranged between the said components, 11, 12, 13 on the one hand and the components 16, 18 on the other hand. The aforesaid components are forced against one another and against the resilient intermediary member by a cap nut 20 in that this cap nut overlaps the sleeve 17 and is screwed on to a screw thread 21 of the shank 11.

While I have described herein and illustrated in the accompanying drawings what may be considered typical and particularlp useful embodiments of my said invention, I wish it to be understood that I do not limit myself to the particular details and dimensions described and illustrated, for obvious modifications will occur to a person skilled in the art.

What I claim as my invention and desire to secure by Letters Patent, is:

1. A resilient coupling for oscillatory tools, comprising in combination: a shank adapted to be fitted into and to be driven by a machine tool and having radial serrations provided at its free end face, a tool piece having at its end face complementary radial serrations, a resilient intermediary member having radial serrations on both faces and being interposed between and coupling the said shank to the said tool proper, and a screw having a resilient washer clamping said shank, tool piece and member together.

2. A resilient coupling for oscillatory tools, comprising in combination: a shank adapted to be fitted into and to be driven by a machine tool and having radial serrations provided at its free end face, a tool carrier chuck having at its end face complementary radial serrations, a resilient intermediary member having radial serrations on both faces and being interposed between and coupling the said shank and chuck with one another, and a screw having a resilient washer clamping the said shank, chuck and member together.

References Cited in the file of this patent
UNITED STATES PATENTS

| | | |
|---|---|---|
| 1,548,629 | Pfander | Aug. 4, 1925 |
| 2,084,080 | D'Aubarede | June 15, 1937 |
| 2,768,832 | Smith | Oct. 30, 1956 |
| 2,793,867 | Stuart | May 28, 1957 |